UNITED STATES PATENT OFFICE 2,159,058

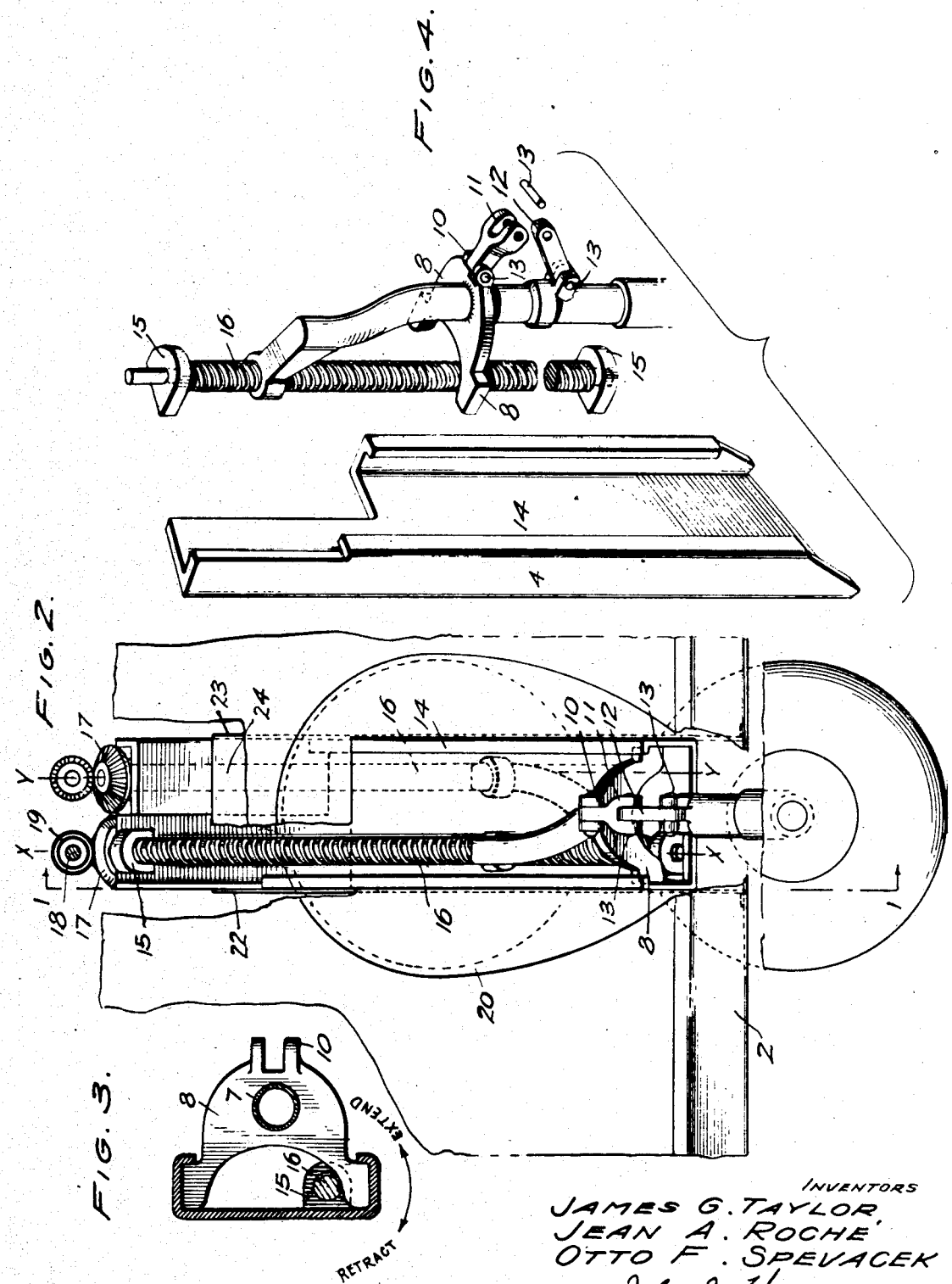

LANDING GEAR FOR AMPHIBIAN AIRPLANES

James G. Taylor, San Rafael, Calif., and Jean A. Roché and Otto F. Spevacek, Dayton, Ohio Application June 24, 1937, Serial No. 150,148

4 Claims. (Cl. 244—101)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in retractable landing gears for aircraft.

An object of our invention is to provide a landing gear of the single strut type, wherein a wheel for ground contact is carried by a single strut adapted to be extended downwardly and outwardly from both side walls of a fuselage or from the side walls of an amphibian hull.

Another object of our invention is to provide adequate bracing means for holding the single strut against landing stress when extended in a manner to provide maximum wheel tracking.

A further object of our invention is to so arrange the screw means for retracting and partially supporting the single struts of our landing gear that a minimum of fuselage or hull width is required with continuing retention of maximum wheel track.

A still further object of our invention is to provide means in a single shock absorbing strut of the telescoping type to prevent relative turning of the several movable parts of the strut whereby the landing wheel is maintained in fore and aft alignment.

Other objects and advantages of our invention will become apparent from the following description taken in connection with the accompanying drawing, it being clearly understood that the same are by way of illustration and example only and are not to be taken as in any way limiting the spirit or scope of our invention. The spirit and scope of our invention is to be limited only by the prior art and by the terms of the appended claims.

Referring to the drawings, in which numerals of like character designate similar parts throughout the several claims:

In Figure 1, an amphibian hull is cut away to show a front profile of our landing gear.

Figure 2 shows our landing gear in side profile, hull partially cut away.

Figure 3 shows a strut detail.

Figure 4 is an exploded view of a portion of the strut assembly.

Figure 1:
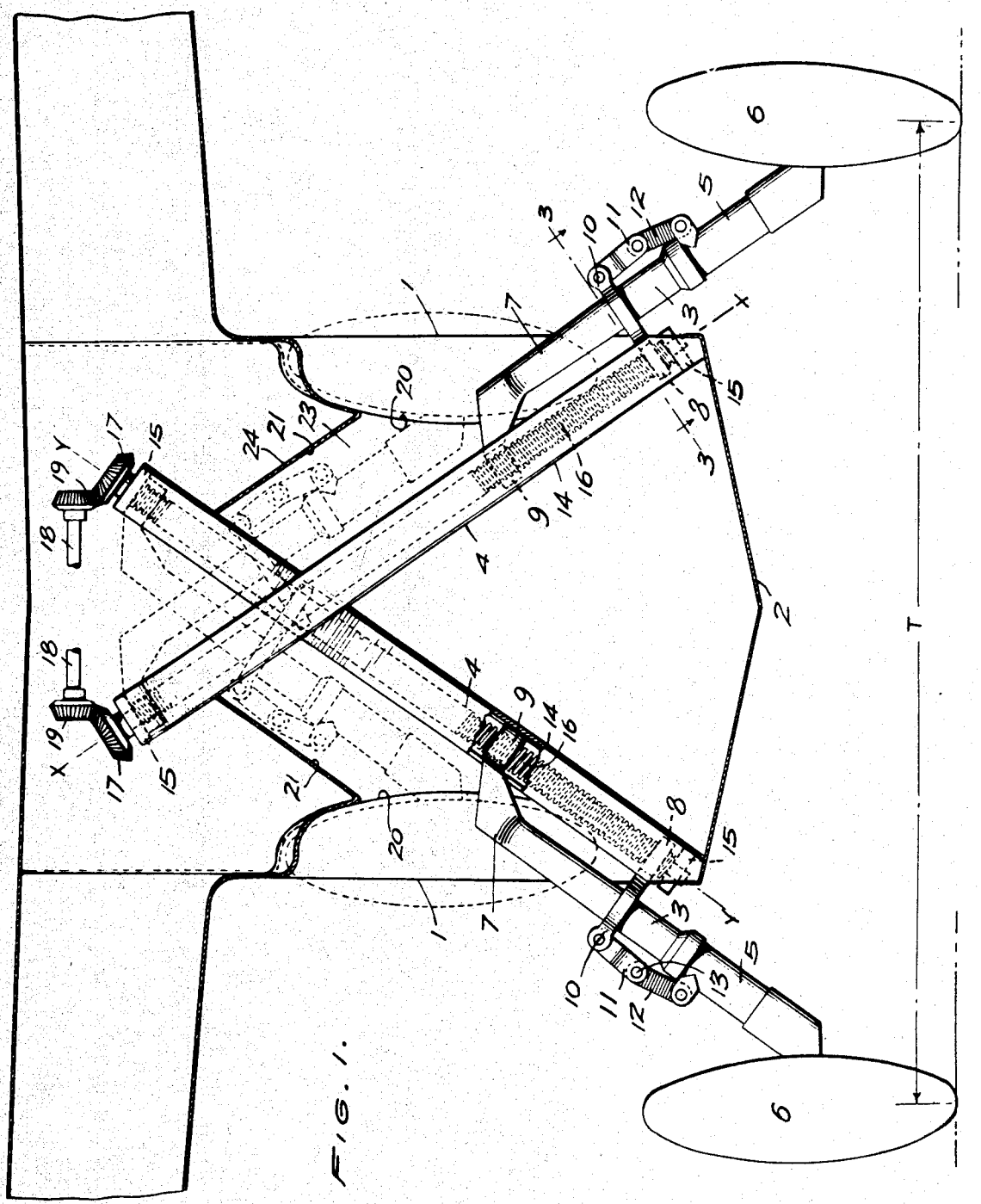

In Figures 1 and 2, side wall portions 1 of a hull 2 are cut away to permit installation of wheel and strut assemblies 3 and their retracting mechanisms 4. In front profile, the longitudinal axes X—X and Y—Y of the retracting mechanisms 4 are crossed or overlapped, as indicated, necessitating the additional fore and aft spacing of Figure 2. This is done in order that the overall width of the hull 2 may be reduced to a minimum, without in any wise reducing the normal wheel track T of Figure 1.

Each wheel and strut assembly 3 is composed of a shock absorbing unit 5, a landing gear wheel 6 journalled to the lower end thereof, and a strut 7 slidably engaging the upper end of the unit 5. A plate 8 with forked projection extending inwardly is fixed to the mid portion of the strut 7, the upper end of which also extends inwardly to terminate in a threaded lug 9. The outermost portion of the plate 8, as well as the upper outermost portion of the unit 5, is provided with vertically disposed pin bosses 10. Axial movement restraining links 11 and 12 are assembled within the bosses 10 by means of pins 13. Figure 4 shows an exploded view of the aforesaid parts.

Each retracting mechanism 4 is composed of a channel member or track 14 for slidably engaging the forked projections of the plate 8 and for further acting as an attachment for bearing plates 15 supporting a retracting screw 16. A bevel gear 17 is fixed to the upper end of the screw 16 which is operated by means of a horizontally disposed shaft 18 and a second bevel gear 19 fixed thereto.

The hull 2 is provided with two wheel cavities 20, in the side wall portions 1, into which the wheels 6 completely recede when retracted. A further passageway 21 is provided for retraction of each wheel and strut assembly 3 by means of fore and aft passage walls 22 and 23 and outer passage wall 24, as clearly indicated in Figures 1 and 2. It will be further noted that the tracks 14 are cut away in side elevation (Figure 2), to permit over-lapping and that the inner surfaces thereof form the "inner passage wall" of the passageway 21.

When not resting upon water, the wheel and strut assemblies 3 are extended in the position shown in Figures 1 and 2. Upon take-off and assumption of sufficient altitude, the wheel and strut assemblies 3 are retracted into the dotted positions of Figures 1 and 2 through clockwise rotation of the retracting screw 16 as shown in Figure 4. The latter position may thereafter be retained for water landing or the retracting screw 16 may be rotated in a counterclockwise direction (Figure 4) for return of the wheel and strut assemblies 3 to the full position shown in Figures 1 and 2.

Although the description is specific to the illustrations in the drawings, it is to be understood that there may be numerous departures therefrom which will still be within the field and scope of our invention, so that we do not wish to be restricted thereto, but only in so far as the appended claims are so limited.

What we claim is:

1. In an aircraft, in combination, a body, a pair of angularly arranged supports extending downwardly and outwardly in a vertical plane transverse to said body and connected in fixed relation thereto, a pair of wheel supporting members, and means rigidly connected to each wheel supporting member and slidably engaging a corresponding support for movement in the direction thereof.

2. In an aircraft, in combination, a body, a pair of supports crossing each other at their upper ends and extending downwardly and outwardly in a vertical plane transverse to said body and connected in fixed relation thereto, a pair of wheel supporting members, and means rigidly connected to each wheel supporting member and slidably engaging a corresponding support for movement in the direction thereof.

3. In an aircraft, in combination, a body, a pair of supports crossing each other at their upper ends and extending downwardly and outwardly in a vertical plane transverse to said body and connected in fixed relation thereto, a pair of wheel supporting members, means rigidly connected to each wheel supporting member and slidably engaging a corresponding support for movement in the direction thereof, and two sets of slidably connected members, each set connecting a support and its corresponding wheel supporting member for effecting relative sliding movement therebetween.

4. In an aircraft, in combination, a body, a pair of channel members notched to cross each other at their upper ends and extending downwardly and outwardly in a vertical plane transverse to said body and connected in fixed relation thereto, a pair of driving screws respectively journalled to said channel members and arranged on opposite sides thereof such that they cross each other at their upper ends, a pair of wheel supporting members having their upper ends drivingly connected to said screws, and means rigidly connected to each wheel supporting member and slidably engaging a corresponding channel member for movement in the direction thereof upon rotation of said driving screws.

JAMES G. TAYLOR.
JEAN A. ROCHÉ.
OTTO F. SPEVACEK.